US012597542B2

(12) United States Patent
Ichimiya et al.

(10) Patent No.: US 12,597,542 B2
(45) Date of Patent: Apr. 7, 2026

(54) SOFT MAGNETIC IRON

(71) Applicant: JFE STEEL CORPORATION, Tokyo (JP)

(72) Inventors: Katsuyuki Ichimiya, Tokyo (JP); Koichi Nakashima, Tokyo (JP); Yuta Imanami, Tokyo (JP)

(73) Assignee: JFR STEEL CORPORATION, Tokyo (JP)

( * ) Notice: Subject to any disclaimer, the term of this patent is extended or adjusted under 35 U.S.C. 154(b) by 347 days.

(21) Appl. No.: 18/248,525

(22) PCT Filed: Oct. 22, 2021

(86) PCT No.: PCT/JP2021/039163

§ 371 (c)(1),
(2) Date: Apr. 11, 2023

(87) PCT Pub. No.: WO2022/091985

PCT Pub. Date: May 5, 2022

(65) Prior Publication Data

US 2023/0411055 A1 Dec. 21, 2023

(30) Foreign Application Priority Data

Oct. 29, 2020 (JP) ................................ 2020-181791

(51) Int. Cl.

| | |
|---|---|
| ***H01F 1/147*** | (2006.01) |
| ***C22C 38/00*** | (2006.01) |
| ***C22C 38/02*** | (2006.01) |
| ***C22C 38/04*** | (2006.01) |

(52) U.S. Cl.

CPC ........... *H01F 1/147* (2013.01); *C22C 38/001* (2013.01); *C22C 38/002* (2013.01); *C22C 38/004* (2013.01); *C22C 38/02* (2013.01); *C22C 38/04* (2013.01)

(58) Field of Classification Search

CPC ..................................................... C22C 38/04
See application file for complete search history.

(56) References Cited

U.S. PATENT DOCUMENTS

| | | | |
|---|---|---|---|
| 3,723,103 | A | 3/1973 | Tetsuo et al. |
| 2007/0034300 | A1 | 2/2007 | Chiba |
| 2017/0162306 | A1 | 6/2017 | Masumoto et al. |
| 2023/0411055 | A1 | 12/2023 | Ichimiya et al. |

FOREIGN PATENT DOCUMENTS

| | | | | |
|---|---|---|---|---|
| JP | S63210254 A | | 8/1988 | |
| JP | 2001303209 A | | 10/2001 | |
| JP | 2003055745 A | * | 2/2003 | ............. C22C 38/00 |
| JP | 2004190122 A | | 7/2004 | |
| JP | 2006328461 A | | 12/2006 | |
| JP | 2007046125 A | | 2/2007 | |
| JP | 2007051343 A | | 3/2007 | |
| JP | 2007238970 A | | 9/2007 | |
| JP | 5374233 B2 | | 12/2013 | |
| JP | 2015127454 A | | 7/2015 | |
| JP | 2017128784 A | | 7/2017 | |
| JP | 2018076557 A | | 5/2018 | |
| WO | 2015113937 A1 | | 8/2015 | |

OTHER PUBLICATIONS

English machine translation of JP 2003-055745 A of Chiba (Year: 2003).*

Dec. 28, 2021, International Search Report issued in the International Patent Application No. PCT/JP2021/039163.

Nov. 12, 2024, Office Action issued by the China National Intellectual Property Administration in the corresponding Chinese Patent Application No. 202180072305.1 with English language concise statement of relevance.

Apr. 4, 2023, Notification of Reasons for Refusal issued by the Japan Patent Office in the corresponding Japanese Patent Application No. 2022-518877 with English language concise statement of relevance.

Aug. 15, 2023, Official Decision of Refusal issued by the Japan Patent Office in the corresponding Japanese Patent Application No. 2022-518877 with English language concise statement of relevance.

Jul. 31, 2024, Office Action issued by the China National Intellectual Property Administration in the corresponding Chinese Patent Application No. 202180072305.1 with English language concise statement of relevance.

Apr. 12, 2024, Office Action issued by the China National Intellectual Property Administration in the corresponding Chinese Patent Application No. 202180072305.1 with English language search report.

May 13, 2025, the Extended European Search Report issued by the European Patent Office in the corresponding European Patent Application No. 21886103.7.

* cited by examiner

*Primary Examiner* — Jophy S. Koshy
(74) *Attorney, Agent, or Firm* — KENJA IP LAW PC

(57) ABSTRACT

Provided is a technique that can achieve both magnetic properties and machinability by cutting at a high level, which has been impossible with only the conventional techniques of improving the machinability by cutting using MnS or the like. A soft magnetic iron comprises a chemical composition containing, in mass %, C: less than 0.02%, Si: less than 0.05%, Mn: more than 0.03% and 0.50% or less, P: 0.002% or more and less than 0.006%, S: 0.013% or more and 0.050% or less, Al: 0.010% or less, N: 0.0010% or more and 0.0100% or less, and B: 0.0003% or more and 0.0065% or less, with a balance consisting of iron and inevitable impurities.

2 Claims, No Drawings

SOFT MAGNETIC IRON

TECHNICAL FIELD

The present disclosure relates to a soft magnetic iron having excellent machinability by cutting and magnetic properties.

BACKGROUND

Resource and energy saving is needed worldwide for global environment protection in recent years. In the field of electrical machinery, efficiency enhancement and downsizing are actively promoted with the aim of saving energy. Hence, electrical parts used in automobiles and the like are required to be more power-saving and be improved in the response speed to external magnetic fields.

Pure iron-based soft magnetic iron is typically used as material that easily responds to external magnetic fields. For such soft magnetic iron, a steel material having a C content of approximately 0.01 mass % or less is used. Usually, the steel material is hot rolled and then subjected to wiredrawing and the like to obtain a steel bar, and the steel bar is subjected to forging, cutting work, and the like to produce electrical parts.

It is known that, in parts machining, soft ferrite single phase contained in soft magnetic iron has very poor workability of cutting. This makes it increasingly important to provide soft magnetic iron excellent in not only magnetic properties but also workability.

For example, JP 2007-51343 A (PTL 1) discloses a technique of producing a soft magnetic steel material excellent in magnetic properties and machinability by cutting by controlling the size and number of MnS precipitates dispersed in steel.

JP 2007-46125 A (PTL 2) discloses a technique for a soft magnetic steel material excellent in cold forgeability, machinability by cutting, and magnetic properties by controlling the size and density of FeS precipitates.

CITATION LIST

Patent Literature

PTL 1: JP 2007-51343 A
PTL 2: JP 2007-46125 A

SUMMARY

Technical Problem

The techniques described in PTL 1 and PTL 2 each improve the machinability by cutting by the effect of MnS or FeS alone. However, increasing such precipitates (MnS or FeS) is likely to cause degradation in magnetic properties. There is thus a technical limit to achieving both magnetic properties and machinability by cutting at a higher level.

It could therefore be helpful to provide a technique that can achieve both magnetic properties and machinability by cutting at a high level, which has been impossible with only the conventional techniques of improving the machinability by cutting using MnS or the like.

Solution to Problem

Upon careful examination, we newly discovered that the use of BN can improve the machinability by cutting without degradation in magnetic properties.

The present disclosure is based on this discovery and further studies. We thus provide:

1. A soft magnetic iron comprising a chemical composition containing (consisting of), in mass %, C: less than 0.02%, Si: less than 0.05%, Mn: more than 0.03% and 0.50% or less, P: 0.002% or more and less than 0.006%, S: 0.013% or more and 0.050% or less, Al: 0.010% or less, N: 0.0010% or more and 0.0100% or less, and B: 0.0003% or more and 0.0065% or less, with a balance consisting of iron and inevitable impurities.
2. The soft magnetic iron according to 1., wherein the chemical composition further contains, in mass %, one or more selected from the group consisting of Cu: 0.20% or less, Ni: 0.30% or less, Cr: 0.30% or less, Mo: 0.10% or less, V: 0.02% or less, Nb: less than 0.015%, and Ti: less than 0.010%.
3. The soft magnetic iron according to 1. or 2., wherein the chemical composition further contains, in mass %, one or more selected from the group consisting of Pb: 0.30% or less, Bi: 0.30% or less, Te: 0.30% or less, Se: 0.30% or less, Ca: 0.0100% or less, Mg: less than 0.0050%, Zr: 0.200% or less, and REM: 0.0100% or less.

Advantageous Effect

It is thus possible to provide a pure iron-based soft magnetic iron having excellent magnetic properties and machinability by cutting.

DETAILED DESCRIPTION

A pure iron-based soft magnetic iron according to an embodiment of the present disclosure will be described below.

First, the reasons for limiting each component in the chemical composition of the pure iron-based soft magnetic iron will be described below. Herein, "%" representing the content of each component element is "mass %" unless otherwise stated.

C: Less than 0.02%

If the C content is 0.02% or more, the iron loss property degrades significantly due to magnetic aging. The C content is therefore limited to less than 0.02%. If the C content is less than 0.001%, the effect on the magnetic properties is saturated. Moreover, reducing the C content to less than 0.001% requires higher refining costs. Accordingly, the C content is preferably 0.001% or more. The C content is preferably in the range of 0.001% or more and 0.015% or less. The C content is more preferably in the range of 0.001% or more and 0.010% or less.

Si: Less than 0.05%

Si is an element effective as a deoxidizing element. If the Si content is 0.05% or more, ferrite hardens, and the cold workability decreases. Accordingly, although Si may be contained, its content is less than 0.05%. The Si content is preferably 0.03% or less. The Si content may be 0%.

Mn: More than 0.03% and 0.50% or Less

Mn is an element that is not only effective in strength improvement by solid solution strengthening but also effective in improvement of machinability by cutting as a result of MnS, which is formed by combination of Mn and S, dispersing in the steel. Accordingly, the Mn content is more than 0.03%. If the Mn content is excessively high, the magnetic properties degrade. The Mn content is therefore 0.50% or less. The Mn content is preferably in the range of more than 0.03% and 0.40% or less. The Mn content is more preferably in the range of more than 0.03% and 0.35% or less.

P: 0.002% or More and Less than 0.006%

P has considerable solid solution strengthening ability even when added in a relatively small amount. To achieve this effect, the P content is 0.002% or more. If the P content is excessively high, the cold workability is impaired. Accordingly, the P content is less than 0.006%.

S: 0.013% or More and 0.050% or Less

S forms MnS in the steel to contribute to improved machinability by cutting. To achieve this effect, the S content needs to be 0.013% or more. If the S content is more than 0.050%, the cold workability degrades. Accordingly, the S content is 0.013% or more and 0.050% or less. The S content is preferably in the range of 0.013% or more and 0.045% or less. The S content is more preferably in the range of 0.013% or more and 0.040% or less.

Al: 0.010% or Less

Al combines with N in the steel to form fine AlN. Such fine AlN hinders the growth of crystal grains and causes degradation in magnetic properties. The Al content therefore needs to be 0.010% or less. The Al content may be 0%.

N: 0.0010% or More and 0.0100% or Less

N combines with B to form BN, thus contributing to improved machinability by cutting. To achieve this effect, the N content needs to be 0.0010% or more. If the N content is more than 0.0100%, the cold workability and the magnetic properties degrade. Accordingly, the upper limit is 0.0100%. The N content is preferably 0.0015% or more. The N content is preferably 0.0090% or less.

B: 0.0003% or More and 0.0065% or Less

B combines with N in the steel to form BN. BN has the effect of improving the machinability by cutting. To achieve this effect, the B content needs to be 0.0003% or more. If the B content is more than 0.0065%, the magnetic properties and the castability degrade. Accordingly, the upper limit is 0.0065%. The B content is preferably 0.0005% or more. The B content is preferably 0.0060% or less. The B content is more preferably 0.0010% or more. The B content is more preferably 0.0055% or less.

The basic components according to the present disclosure have been described above. The balance other than the foregoing components consists of Fe and inevitable impurities. The chemical composition may optionally further contain one or more of the following elements as appropriate:

Cu: 0.20% or less,
Ni: 0.30% or less,
Cr: 0.30% or less,
Mo: 0.10% or less,
V: 0.02% or less,
Nb: less than 0.015%, and
Ti: less than 0.010%.

Cu, Ni, and Cr contribute to higher strength mainly by solid solution strengthening. To achieve this effect, the content of each element is preferably 0.01% or more. If the content is excessively high, the magnetic properties degrade. Accordingly, the upper limits of the contents of Cu, Ni, and Cr are preferably 0.20%, 0.30%, and 0.30%, respectively.

Mo, V, Nb, and Ti contribute to higher strength mainly by strengthening by precipitation. To achieve this effect, the contents of Mo, V, Nb, and Ti are preferably 0.001% or more, 0.0001% or more, 0.0001% or more, and 0.0001% or more, respectively. If the content of each element is excessively high, the magnetic properties degrade. Accordingly, the contents of Mo, V, Nb, and Ti are preferably 0.10% or less, 0.02% or less, less than 0.015%, and less than 0.010%, respectively.

The chemical composition according to the present disclosure may further contain one or more of the following elements:

Pb: 0.30% or less,
Bi: 0.30% or less,
Te: 0.30% or less,
Se: 0.30% or less,
Ca: 0.0100% or less,
Mg: less than 0.0050%,
Zr: 0.200% or less, and
REM: 0.0100% or less.

Pb, Bi, Te, Se, Ca, Mg, Zr, and REM are elements that contribute to improved machinability by cutting. To achieve this effect, the Pb content is preferably 0.001% or more, the Bi content is preferably 0.001% or more, the Te content is preferably 0.001% or more, the Se content is preferably 0.001% or more, the Ca content is preferably 0.0001% or more, the Mg content is preferably 0.0001% or more, the Zr content is preferably 0.005% or more, and the REM content is preferably 0.0001% or more. If the content of each element is excessively high, the magnetic properties degrade. Accordingly, the Pb content is preferably 0.30% or less, the Bi content is preferably 0.30% or less, the Te content is preferably 0.30% or less, the Se content is preferably 0.30% or less, the Ca content is preferably 0.0100% or less, the Mg content is preferably less than 0.0050%, the Zr content is preferably 0.200% or less, and the REM content is preferably 0.0100% or less.

The components other than the above in the chemical composition according to the present disclosure are Fe and inevitable impurities.

A preferred method of producing the pure iron-based soft magnetic iron according to the present disclosure will be described below.

Molten steel having the chemical composition described above is obtained by a smelting method such as a typical converter or electric furnace, and subjected to typical continuous casting or blooming to yield a steel material. The steel material is then optionally heated, and then subjected to hot rolling such as billet rolling and/or bar/wire rolling etc. to obtain a soft magnetic iron. The heating conditions and the rolling conditions are not limited, and may be determined as appropriate depending on the material properties required. For example, microstructure control is performed so as to be advantageous for subsequent forging, machining, etc. for forming parts. Since the soft magnetic iron according to the present disclosure has excellent workability of cutting, the shape of the soft magnetic iron is preferably any of a bar, a rod, and a wire, which are mainly used in applications involving cutting work.

The content of each element can be determined by the method for spark discharge atomic emission spectrometric analysis, X-ray fluorescence analysis, ICP optical emission spectrometry, ICP mass spectrometry, combustion method, etc.

The other production conditions may be in accordance with typical steel material production methods.

EXAMPLES

Examples according to the present disclosure will be described below. The presently disclosed technique is, however, not limited to the examples below.

Steels having the chemical compositions shown in Table 1 were each obtained by smelting, then subjected to hot forging at approximately 1200° C., and then subjected to annealing treatment at 950° C. to produce a steel bar of 25 mm in diameter. For each obtained steel bar, the magnetic properties, the cold workability, and the machinability by cutting were evaluated by the following methods. The evaluation results are shown in Table 2.

TABLE 1

| Steel sample ID | C | Si | Mn | P | S | Al | N | B | Cu | Ni | Cr | Mo | V | Nb |
|---|---|---|---|---|---|---|---|---|---|---|---|---|---|---|
| A | 0.005 | 0.015 | 0.217 | 0.005 | 0.019 | 0.002 | 0.007 | 0.0024 | 0.03 | — | — | — | — | — |
| B | 0.007 | 0.010 | 0.215 | 0.003 | 0.022 | 0.001 | 0.006 | 0.0026 | — | 0.02 | — | — | — | — |
| C | 0.026 | 0.029 | 0.169 | 0.003 | 0.014 | 0.003 | 0.005 | 0.0034 | — | — | — | — | — | — |
| D | 0.004 | 0.420 | 0.118 | 0.005 | 0.018 | 0.004 | 0.006 | 0.0017 | 0.11 | — | — | — | — | — |
| E | 0.003 | 0.014 | 0.181 | 0.032 | 0.019 | 0.003 | 0.003 | 0.0016 | — | — | — | 0.020 | — | — |
| F | 0.004 | 0.020 | 0.142 | 0.003 | 0.094 | 0.002 | 0.003 | 0.0015 | — | — | — | — | 0.0009 | — |
| G | 0.010 | 0.026 | 0.176 | 0.003 | 0.027 | 0.002 | 0.004 | 0.0023 | — | 0.61 | — | — | — | — |
| H | 0.005 | 0.026 | 0.179 | 0.004 | 0.021 | 0.001 | 0.002 | 0.0017 | — | 0.07 | — | — | 0.0570 | — |
| I | 0.006 | 0.017 | 0.240 | 0.003 | 0.019 | 0.001 | 0.003 | 0.0026 | — | — | — | — | — | — |
| J | 0.007 | 0.020 | 0.217 | 0.005 | 0.025 | 0.002 | 0.006 | 0.0019 | — | — | — | 0.012 | — | — |
| K | 0.003 | 0.026 | 0.192 | 0.003 | 0.031 | 0.003 | 0.007 | 0.0013 | — | 0.11 | — | — | — | — |
| L | 0.005 | 0.016 | 0.102 | 0.005 | 0.018 | 0.003 | 0.007 | 0.0026 | — | — | — | — | — | — |
| M | 0.003 | 0.017 | 0.194 | 0.004 | 0.017 | 0.003 | 0.006 | 0.0001 | 0.04 | — | — | — | — | 0.0013 |
| N | 0.017 | 0.123 | 0.210 | 0.005 | 0.021 | 0.004 | 0.005 | 0.0016 | — | 0.03 | — | — | — | — |
| O | 0.003 | 0.021 | 0.420 | 0.004 | 0.026 | 0.004 | 0.004 | 0.0015 | — | — | 0.03 | — | — | — |
| P | 0.006 | 0.032 | 0.231 | 0.004 | 0.013 | 0.009 | 0.002 | 0.0072 | 0.06 | — | — | 0.017 | — | — |
| Q | 0.010 | 0.017 | 0.167 | 0.005 | 0.022 | 0.009 | 0.008 | 0.0020 | — | — | 0.01 | — | — | — |
| R | 0.005 | 0.016 | 0.162 | 0.005 | 0.022 | 0.008 | 0.008 | 0.0023 | — | — | — | — | — | — |
| S | 0.007 | 0.019 | 0.195 | 0.004 | 0.022 | 0.005 | 0.008 | 0.0009 | — | — | — | 0.002 | — | — |
| T | 0.007 | 0.017 | 0.189 | 0.005 | 0.017 | 0.010 | 0.003 | 0.0013 | — | — | — | — | 0.0009 | — |
| U | 0.004 | 0.010 | 0.203 | 0.005 | 0.018 | 0.004 | 0.008 | 0.0012 | — | — | — | — | — | 0.0007 |
| V | 0.007 | 0.015 | 0.242 | 0.005 | 0.016 | 0.007 | 0.003 | 0.0026 | — | — | — | — | — | — |
| W | 0.006 | 0.018 | 0.199 | 0.003 | 0.021 | 0.008 | 0.008 | 0.0021 | — | — | — | — | — | — |
| X | 0.010 | 0.018 | 0.225 | 0.005 | 0.018 | 0.006 | 0.003 | 0.0023 | — | — | — | — | — | — |
| Y | 0.005 | 0.015 | 0.227 | 0.005 | 0.016 | 0.007 | 0.008 | 0.0015 | — | — | — | — | — | — |
| Z | 0.005 | 0.013 | 0.247 | 0.005 | 0.016 | 0.005 | 0.007 | 0.0026 | — | — | — | — | — | — |
| AA | 0.011 | 0.016 | 0.010 | 0.003 | 0.016 | 0.010 | 0.010 | 0.0015 | — | 0.02 | — | — | — | — |
| AB | 0.006 | 0.012 | 0.212 | 0.005 | 0.020 | 0.061 | 0.004 | 0.0019 | — | — | — | — | — | — |
| AC | 0.006 | 0.019 | 0.185 | 0.002 | 0.022 | 0.006 | 0.013 | 0.0021 | 0.03 | — | — | — | — | — |
| AD | 0.008 | 0.016 | 0.152 | 0.004 | 0.018 | 0.009 | 0.003 | 0.0084 | — | — | — | — | 0.0120 | — |
| AE | 0.007 | 0.015 | 0.191 | 0.004 | 0.015 | 0.008 | 0.009 | 0.0014 | — | 0.16 | — | — | — | — |
| AF | 0.001 | 0.013 | 0.203 | 0.005 | 0.017 | 0.009 | 0.006 | 0.0011 | 0.56 | — | — | — | — | — |
| AG | 0.011 | 0.013 | 0.198 | 0.003 | 0.016 | 0.003 | 0.006 | 0.0026 | — | — | 0.42 | — | — | — |
| AH | 0.009 | 0.013 | 0.169 | 0.005 | 0.017 | 0.009 | 0.008 | 0.0011 | — | — | — | 0.260 | — | — |
| AI | 0.002 | 0.013 | 0.210 | 0.004 | 0.023 | 0.009 | 0.007 | 0.0024 | — | — | — | — | 0.0050 | 0.0410 |
| AJ | 0.002 | 0.011 | 0.237 | 0.003 | 0.023 | 0.007 | 0.002 | 0.0019 | — | — | 0.03 | — | — | — |
| AK | 0.005 | 0.016 | 0.184 | 0.003 | 0.017 | 0.010 | 0.005 | 0.0027 | — | — | — | — | — | — |
| AL | 0.011 | 0.014 | 0.209 | 0.004 | 0.022 | 0.006 | 0.010 | 0.0021 | — | — | — | — | — | — |
| AM | 0.011 | 0.013 | 0.155 | 0.003 | 0.020 | 0.007 | 0.005 | 0.0013 | — | 0.04 | — | — | — | — |
| AN | 0.009 | 0.014 | 0.198 | 0.0004 | 0.021 | 0.003 | 0.006 | 0.0022 | — | — | — | — | — | — |

| Steel sample ID | Ti | Pb | Bi | Te | Se | Ca | Mg | Zr | REM | Remarks |
|---|---|---|---|---|---|---|---|---|---|---|
| A | — | 0.050 | — | — | — | — | — | — | — | Example |
| B | — | — | — | 0.003 | — | — | — | — | — | Example |
| C | — | — | — | — | — | — | — | — | — | Comparative Example |
| D | — | — | — | — | — | — | — | — | — | Comparative Example |
| E | — | — | — | — | — | — | — | — | — | Comparative Example |
| F | — | — | — | — | — | — | 0.0012 | — | — | Comparative Example |
| G | — | — | — | — | — | 0.0004 | — | — | — | Comparative Example |
| H | — | — | — | — | — | — | 0.0007 | — | — | Comparative Example |
| I | — | 0.440 | — | — | — | — | — | — | — | Comparative Example |
| J | — | — | 0.520 | — | — | — | — | — | — | Comparative Example |
| K | — | — | — | 0.490 | — | — | — | — | — | Comparative Example |
| L | — | — | — | — | — | — | — | — | 0.012 | Comparative Example |
| M | — | — | — | 0.004 | — | — | — | — | — | Comparative Example |

TABLE 1-continued

| | | | | | | | | | | |
|---|---|---|---|---|---|---|---|---|---|---|
| N | 0.0012 | — | — | — | — | — | — | — | — | Example |
| O | — | — | — | — | — | — | — | — | — | Example |
| P | — | — | — | 0.003 | — | — | — | — | — | Comparative Example |
| Q | — | — | — | — | — | — | — | — | — | Example |
| R | — | — | 0.001 | — | — | — | — | — | — | Example |
| S | — | — | — | — | — | — | — | — | — | Example |
| T | — | — | — | — | — | — | — | — | — | Example |
| U | — | — | — | — | — | — | — | — | — | Example |
| V | 0.0002 | — | — | — | — | — | — | 0.0003 | — | Example |
| W | — | — | — | — | — | — | 0.0002 | — | — | Example |
| X | — | — | — | — | 0.001 | — | — | — | — | Example |
| Y | — | — | — | 0.002 | — | — | — | — | 0.001 | Example |
| Z | — | — | — | — | — | 0.0002 | — | — | — | Example |
| AA | — | — | — | — | — | — | — | 0.0550 | — | Comparative Example |
| AB | — | — | 0.120 | — | — | — | — | — | — | Comparative Example |
| AC | 0.0090 | — | — | — | — | — | — | — | — | Comparative Example |
| AD | — | — | — | — | — | — | — | — | — | Comparative Example |
| AE | — | — | — | — | 0.340 | — | — | — | — | Comparative Example |
| AF | — | — | — | — | — | — | — | 0.0260 | — | Comparative Example |
| AG | — | 0.140 | — | — | — | — | — | — | — | Comparative Example |
| AH | — | — | — | 0.002 | — | — | — | — | — | Comparative Example |
| AI | — | — | — | — | — | — | — | — | — | Comparative Example |
| AJ | 0.0340 | — | — | — | — | — | — | — | — | Comparative Example |
| AK | — | — | — | — | — | 0.0121 | — | — | — | Comparative Example |
| AL | — | — | 0.160 | — | — | — | 0.0113 | — | — | Comparative Example |
| AM | — | — | — | — | — | — | — | 0.2300 | — | Comparative Example |
| AN | — | 0.120 | — | — | — | — | — | — | — | Comparative Example |

Unit: mass %

Underlines indicate outside the range according to the present disclosure.

TABLE 2

| | Magnetic properties | | | Cold workability | Machinability | |
|---|---|---|---|---|---|---|
| Steel sample ID | Magnetic flux density at 100 A/m (T) | Magnetic flux density at 300 A/m (T) | Coercive force (A/m) | Critical upset ratio to crack initiation (%) | by cutting Flank wear (μm) | Remarks |
| A | 1.280 | 1.586 | 48.5 | 59.3 | 29.6 | Example |
| B | 1.241 | 1.540 | 51.7 | 60.9 | 21.0 | Example |
| C | 1.120 | 1.404 | 84.1 | 66.1 | 29.7 | Comparative Example |
| D | 1.282 | 1.609 | 71.5 | 61.0 | 42.0 | Comparative Example |
| E | 1.268 | 1.570 | 45.5 | 42.3 | 24.9 | Comparative Example |
| F | 1.249 | 1.571 | 81.2 | 66.1 | 25.3 | Comparative Example |
| G | 1.097 | 1.384 | 74.3 | 58.8 | 26.4 | Comparative Example |
| H | 1.123 | 1.413 | 82.1 | 47.9 | 23.7 | Comparative Example |
| I | 1.106 | 1.405 | 75.1 | 45.6 | 23.8 | Comparative Example |
| J | 1.112 | 1.405 | 74.6 | 46.1 | 27.9 | Comparative Example |
| K | 1.162 | 1.465 | 76.2 | 43.2 | 22.8 | Comparative Example |
| L | 1.136 | 1.410 | 74.9 | 45.5 | 22.8 | Comparative Example |
| M | 1.226 | 1.534 | 54.6 | 59.7 | 40.3 | Comparative Example |
| N | 1.206 | 1.526 | 52.9 | 57.1 | 28.7 | Example |
| O | 1.209 | 1.537 | 55.9 | 59.3 | 27.4 | Example |
| P | 1.175 | 1.507 | 60.9 | 49.6 | 23.1 | Comparative Example |
| Q | 1.300 | 1.528 | 58.5 | 59.6 | 29.5 | Example |
| R | 1.244 | 1.515 | 55.9 | 58.6 | 29.3 | Example |
| S | 1.205 | 1.532 | 52.7 | 55.8 | 27.6 | Example |
| T | 1.226 | 1.522 | 57.1 | 55.5 | 31.5 | Example |
| U | 1.206 | 1.511 | 50.5 | 58.6 | 27.5 | Example |
| V | 1.262 | 1.554 | 56.8 | 58.3 | 30.0 | Example |
| W | 1.259 | 1.583 | 58.3 | 58.0 | 27.6 | Example |

TABLE 2-continued

| | Magnetic properties | | | Cold workability | Machinability | |
|---|---|---|---|---|---|---|
| Steel sample ID | Magnetic flux density at 100 A/m (T) | Magnetic flux density at 300 A/m (T) | Coercive force (A/m) | Critical upset ratio to crack initiation (%) | by cutting Flank wear (μm) | Remarks |
| X | 1.227 | 1.596 | 51.5 | 56.2 | 27.7 | Example |
| Y | 1.208 | 1.584 | 52.9 | 56.2 | 30.8 | Example |
| Z | 1.206 | 1.581 | 51.7 | 55.6 | 29.3 | Example |
| AA | 1.151 | 1.414 | 71.8 | 46.2 | 36.7 | Comparative Example |
| AB | 1.115 | 1.401 | 67.1 | 47.2 | 32.0 | Comparative Example |
| AC | 1.152 | 1.425 | 68.0 | 52.0 | 39.1 | Comparative Example |
| AD | 1.148 | 1.365 | 70.0 | 51.0 | 36.8 | Comparative Example |
| AE | 1.144 | 1.420 | 67.6 | 52.1 | 26.5 | Comparative Example |
| AF | 1.136 | 1.418 | 76.1 | 52.3 | 35.6 | Comparative Example |
| AG | 1.102 | 1.422 | 66.9 | 43.1 | 40.0 | Comparative Example |
| AH | 1.154 | 1.402 | 71.1 | 50.9 | 35.6 | Comparative Example |
| AI | 1.135 | 1.430 | 65.4 | 53.1 | 38.5 | Comparative Example |
| AJ | 1.129 | 1.414 | 72.4 | 51.2 | 38.7 | Comparative Example |
| AK | 1.145 | 1.411 | 67.7 | 50.6 | 39.1 | Comparative Example |
| AL | 1.157 | 1.423 | 69.7 | 51.6 | 38.2 | Comparative Example |
| AM | 1.143 | 1.407 | 72.7 | 48.1 | 37.1 | Comparative Example |
| AN | 1.130 | 1.416 | 64.8 | 52.1 | 40.1 | Comparative Example |

[Magnetic Properties]

The magnetic properties were measured in accordance with JIS C 2504. In detail, a ring-shaped test piece was collected from the steel bar (material), and subjected to magnetic annealing of holding at 750° C. for 2 h. After this, an excitation winding (primary winding: 220 turns) and a detection winding (secondary winding: 100 turns) were made around the ring-shaped test piece for testing. The magnetic flux density was determined by measuring the B-H curve using a DC magnetizing measurement device. Specifically, the respective magnetic flux densities at 100 A/m and 300 A/m in a magnetization process with a peak magnetic field of 10,000 A/m were determined. The magnetic properties were regarded as excellent if the respective magnetic flux densities were 1.20 T or more and 1.50 T or more.

Using a ring-shaped test piece having the same windings as above, the coercive force was measured with a reversal magnetization force of ±400 A/m using a DC magnetic property tester. The magnetic properties were regarded as excellent if the coercive force was 60 A/m or less.

[Cold Workability]

The cold workability was evaluated based on the critical upset ratio. In detail, a test piece of 15 mm in diameter and 22.5 mm in height and having a notch with a depth of 0.8 mm and a notch bottom radius R 0.15 on its side surface was collected from the depth position corresponding to ½ of the diameter from the peripheral surface of the steel bar. The test piece was subjected to compression forming. Compression was successively performed until a crack with a width of 0.5 mm or more occurred at the notch bottom of the test piece. The upset ratio at the time was taken to be the critical upset ratio.

The cold workability was regarded as excellent if the critical upset ratio was 55% or more.

[Machinability by Cutting]

The machinability by cutting was evaluated by measuring the flank wear of the tool. In detail, using a NC lathe, the steel bar of 25 mm in diameter was subjected to cutting work with a cut depth of 0.2 mm, a feed rate of 0.15 mm/rev, a peripheral speed of 300 m/min, wet type, and a length of cut of 1000 m by a coating tool of cemented carbide. After this, the flank wear of the tool was measured to evaluate the machinability by cutting. The machinability by cutting was regarded as excellent if the flank wear was 35 μm or less.

The invention claimed is:

1. A soft magnetic iron comprising a chemical composition consisting of, in mass %, C: less than 0.02%,
Si: less than 0.05%,
Mn: more than 0.03% and 0.50% or less,
P: 0.002% or more and 0.005% or less,
S: 0.013% or more and 0.050% or less,
Al: 0.010% or less,
N: 0.0010% or more and 0.0100% or less, and
B: 0.0003% or more and 0.0065% or less, and optionally, in mass %, one or more selected from the group consisting of Cu: 0.20% or less,
Ni: 0.30% or less,
Cr: 0.30% or less,
Mo: 0.10% or less,
V: 0.02% or less,
Nb: less than 0.015%,
Ti: less than 0.010%,
Pb: 0.30% or less,
Bi: 0.30% or less,
Te: 0.30% or less,
Se: 0.30% or less,
Ca: 0.0100% or less,
Mg: less than 0.0050%,
Zr: 0.200% or less, and
REM: 0.0100% or less, with a balance consisting of iron and inevitable impurities, wherein a magnetic flux density at 100 A/m in a magnetization process with a peak magnetic field of 10,000 A/m is 1.20 T or more, a magnetic flux density at 300 A/m in a magnetization process with a peak magnetic field of 10.000 A/m is 1.50 T or more, and a coercive force measured with a reversal magnetization force of ±400 A/m is 60 A/m or less, wherein a critical upset ratio, which is an upset ratio when a crack occurred during successive compression, is 55% or more, and wherein a flank wear, which is measured after a cutting work with a cut depth of 0.2 mm, a feed rate of 0.15 mm/rev, a peripheral speed of 300 m/min, wet type, and a length of cut of 1000 m, is 35 μm or less.

2. The soft magnetic iron according to claim 1, wherein the soft magnetic iron is in a form of a bar, a rod, or a wire.

* * * * *